United States Patent
Kim

(10) Patent No.: US 11,543,518 B2
(45) Date of Patent: Jan. 3, 2023

(54) VEHICLE RADAR APPARATUS AND METHOD OF CONTROLLING THE SAME

(71) Applicant: HYUNDAI MOBIS Co., Ltd., Seoul (KR)

(72) Inventor: Se Yoon Kim, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 243 days.

(21) Appl. No.: 16/880,841

(22) Filed: May 21, 2020

(65) Prior Publication Data
US 2021/0141084 A1 May 13, 2021

(30) Foreign Application Priority Data
Nov. 7, 2019 (KR) .................. 10-2019-0141555

(51) Int. Cl.
*G01S 13/931* (2020.01)
*G01S 7/295* (2006.01)
*G01S 13/90* (2006.01)

(52) U.S. Cl.
CPC ............ *G01S 13/931* (2013.01); *G01S 7/295* (2013.01); *G01S 13/9011* (2013.01)

(58) Field of Classification Search
CPC .... G01S 13/931; G01S 13/42; G01S 13/9011; G01S 7/4034; G01S 7/403; G01S 7/295; G01S 2013/93271; G01S 2013/0245
USPC ................................. 342/70, 146, 147, 107
See application file for complete search history.

(56) References Cited

U.S. PATENT DOCUMENTS

| | | | | |
|---|---|---|---|---|
| 8,390,507 B2* | 3/2013 | Wintermantel | ....... | G01S 7/0233 342/70 |
| 8,436,763 B2* | 5/2013 | Wintermantel | ....... | G01S 7/0233 342/70 |
| 8,665,137 B2* | 3/2014 | Wintermantel | ....... | G01S 13/343 342/188 |
| 9,541,639 B2* | 1/2017 | Searcy | ...................... | G01S 7/03 |
| 10,302,755 B2* | 5/2019 | Harris | ...................... | H01Q 3/08 |
| 10,634,775 B2* | 4/2020 | Loesch | ...................... | G01S 7/03 |
| 10,725,162 B2* | 7/2020 | Rao | .......................... | G01S 13/06 |
| 10,823,819 B2* | 11/2020 | Loesch | ................ | H01Q 21/065 |
| 11,131,749 B2* | 9/2021 | Loesch | ................... | G01S 13/42 |
| 11,131,761 B2* | 9/2021 | Rao | .......................... | G01S 13/06 |

(Continued)

FOREIGN PATENT DOCUMENTS

KR  10-0278142    10/2000
KR  10-2018-0116325  10/2018

*Primary Examiner* — Erin F Heard
*Assistant Examiner* — Michael W Justice
(74) *Attorney, Agent, or Firm* — H.C. Park & Associates, PLC

(57) ABSTRACT

A vehicle radar apparatus and a method of controlling the vehicle radar apparatus, including a transmission array antenna that radiates a radar signal for forward detection; a reception array antenna that operates at N (N is an integer greater than zero) reception channels for receiving the radar signal that is radiated by the transmission array antenna, reflects from a target, and returns; an azimuth angle estimation unit that estimates an azimuth angle of the target using each non-offset reception channel of the N reception channels; and an elevation angle estimation unit that estimates an elevation angle of the target in a diagonal direction in which each non-offset channel of the N reception channels is tilted with respect to an azimuth angle of an offset reception channel thereof.

8 Claims, 9 Drawing Sheets

(56) References Cited

U.S. PATENT DOCUMENTS

| | | | |
|---|---|---|---|
| 2010/0123616 A1* | 5/2010 | Minami | H01Q 21/08 342/147 |
| 2011/0074620 A1* | 3/2011 | Wintermantel | G01S 7/023 342/70 |
| 2011/0074621 A1* | 3/2011 | Wintermantel | G01S 7/032 342/70 |
| 2011/0080314 A1* | 4/2011 | Wintermantel | G01S 13/931 342/147 |
| 2015/0285904 A1* | 10/2015 | Rao | G01S 13/06 342/146 |
| 2016/0033632 A1* | 2/2016 | Searcy | G01S 13/424 342/153 |
| 2017/0102460 A1* | 4/2017 | Harris | G01S 13/72 |
| 2017/0307744 A1* | 10/2017 | Loesch | G01S 13/06 |
| 2017/0322296 A1* | 11/2017 | Rao | H01Q 25/00 |
| 2019/0011532 A1* | 1/2019 | Loesch | H01Q 1/3233 |
| 2019/0391230 A1* | 12/2019 | Loesch | G01S 7/032 |
| 2020/0301000 A1* | 9/2020 | Rao | G01S 13/42 |

* cited by examiner ual value on the each axis in the direction vertical to the corresponding axis, and determine a final elevation angle by obtaining an average of the calculated elevation angles.

In an embodiment, the elevation angle calculation module may calculate the average of the elevation angles by assigning a weighting factor that increases as the non-offset reception channel gets closer to the offset reception channel.# VEHICLE RADAR APPARATUS AND METHOD OF CONTROLLING THE SAME

CROSS-REFERENCE TO RELATED APPLICATION

This application claims priority from and the benefit of Korean Patent Application No. 10-2019-0141555, filed on Nov. 7, 2019, which is hereby by reference for all purposes as if set forth herein.

BACKGROUND

Field

Exemplary embodiments of the present disclosure relate to a vehicle radar apparatus and a method of controlling the vehicle radar apparatus, and more particularly, to a vehicle radar apparatus and a method of controlling the vehicle radar apparatus, which estimate an elevation angle of a target in a diagonal direction in which each non-offset reception channel of N reception channels at which a reception array antenna operate is tilted with respect to an azimuth angle of an offset reception channel thereof.

Discussion of the Background

A radar apparatus emits an electromagnetic wave to an object, receives the electromagnetic wave that reflects from the object, and thus, detects an interval to the object and a direction, a speed, an altitude, etc., of the object. On the other hand, for the purpose of achieving the driver's safety, vehicle radar apparatuses have been developed. Generally, these vehicle radar apparatuses are manufactured in such a manner as to employ a structure in which a substrate-type antenna is used in a monolithic microwave integrated circuit (MMIC) structure to employ a substrate-type antenna. Specifically, a transmission MMIC, a reception MMIC, and a signal generation MMIC may be included in the vehicle radar apparatus. The vehicle radar apparatus operates on the principle that the signal generation MMIC generates a signal in an approximately 77 GHz frequency, that the transmission MMIC transmits the generated signal in a range for detecting an object, and that the reception MMIC receives the transmitted signal.

However, a vehicle radar apparatus according to the related art operates at a separate channel and includes a receiver in order to calculate an elevation angle, and thus an azimuth angle and the elevation angle are separately calculated, resulting in the disadvantage of increasing the size of the vehicle radar apparatus.

Accordingly, there has been a demand for development of technology for a vehicle radar apparatus that is capable of calculating an elevation angle, as well as an azimuth angle, without a separate channel and a separate receiver for calculating the elevation angle.

The above information disclosed in this Background section is only for enhancement of understanding of the background of the invention and, therefore, it may contain information that does not constitute prior art.

SUMMARY

Exemplary embodiments are directed to a vehicle radar apparatus and a method of controlling the vehicle radar apparatus that are capable of calculating an elevation angle, as well as an azimuth angle, without a separated channel and a receiver for calculating the elevation angle.

Problems to be solved by that the present disclosure are not limited to those described above, and other problems that are not described above will be clearly understood by a person of ordinary skill in the art from the following description.

In an embodiment, a vehicle radar apparatus includes: a transmission array antenna that radiates a radar signal for forward detection; a reception array antenna that operates at N reception channels for receiving the radar signal that is radiated by the transmission array antenna, reflects from a target, and returns; an azimuth angle estimation unit that estimates an azimuth angle of the target using each non-offset reception channel of the N (N is an integer greater than zero) reception channels; and an elevation angle estimation unit that estimates an elevation angle of the target in a diagonal direction in which the each non-offset channel of the N reception channels is tilted with respect to an azimuth angle of an offset reception channel thereof.

In an embodiment, the elevation angle estimation unit includes: an angle calculation module configured to calculate an angle at which the each non-offset reception channel is tilted with respect to the azimuth angle of the offset reception channel; an interval calculation module configured to calculate an interval between the reception channels in the diagonal direction in which the each non-offset reception channel is tilted with respect to the azimuth angle of the offset reception channel; a position calculation module configured to calculate a positional value on each axis in the diagonal direction in which the each non-offset is channel is tilted with respect to the azimuth angle of the offset reception channel, using a phase difference between the offset reception channel and the each non-offset reception channel; and an elevation angle calculation module configured to calculate an elevation angle that corresponds to the positional value, using a straight line drawn from the positional value on the each axis in a direction vertical to the corresponding axis and to determine a final elevation angle using each of the calculated elevation angles.

In an embodiment, the angle calculation module may calculate a tilted angle using a separation interval in the vertical direction and an interval in a horizontal direction between the each non-offset reception channel and the offset reception channel.

In an embodiment, the position calculation module may calculates the positional value on the each axis using the tilted angle calculated by the angle calculation module, the interval between the reception channels in the diagonal direction, which is calculated by the interval calculation module, and the phase difference between the offset reception channel and the each non-offset reception channel.

In an embodiment, the elevation angle calculation module may calculate an elevation angle at each position represented by a coordinate system by substituting the tilted angle, the interval in the diagonal direction between the reception channels, and the positional value on the each axis into a linear equation for which a graph is a straight line drawn from the positional value on the each axis in the direction vertical to the corresponding axis, and determine a final elevation angle by obtaining an average of the calculated elevation angles.

In an embodiment, the elevation angle calculation module may calculate the average of the elevation angles by assigning a weighting factor that increases as the non-offset reception channel gets closer to the offset reception channel.

In an embodiment, the apparatus may further include a signal generation unit that generates a frequency signal that is to be provided to the transmission array antenna.

In an embodiment, a method of controlling a vehicle radar apparatus, the method including: radiating, by a transmission array antenna, a radar signal for forward detection; receiving, by a reception array antenna operating at N reception channels, a radar signal that is radiated by the transmission array antenna, reflects from a target, and returns; estimating an azimuth angle of the target using each non-offset reception channel of the N reception channels; and estimating an elevation angle of the target in a diagonal direction in which the each non-offset reception channel of the N reception channels is tilted with respect to an azimuth angle of an offset reception channel thereof.

In an embodiment, the estimating of the elevation angle may include calculating an angle at which the each non-offset reception channel is tilted with respect to the azimuth angle of the offset reception channel; calculating an interval between the reception channels in the diagonal direction in which the each non-offset reception channel is tilted with respect to the azimuth angle of the offset reception channel; calculating a positional value on each axis in the diagonal direction in which the each non-offset channel is tilted with respect to the azimuth angle of the offset reception channel, using a phase difference between the offset reception channel and the each non-offset reception channel; and calculating an elevation angle that corresponds to the positional value, using a straight line drawn from the positional value on the each axis in a direction vertical to the corresponding axis and determining a final elevation angle using each of the calculated elevation angles.

In an embodiment, the calculating of the angle may calculate a tilted angle using a separation interval in the vertical direction and an interval in a horizontal direction between the each non-offset reception channel and the offset reception channel.

In an embodiment, the calculating of the positional value on each axis in the diagonal direction may calculate the positional value on the each axis using the calculated tilted angle, the calculated interval between the reception channels in the diagonal direction, and the phase difference between the offset reception channel and the each non-offset reception channel.

In an embodiment, the determining of the final elevation angle may calculate an elevation angle at each position represented by a coordinate system by substituting the tilted angle, the interval between the reception channels in the diagonal direction, and the positional value on the each axis in the diagonal direction into a linear equation for which a graph is a straight line drawn from the positional value on the each axis in the direction vertical to the axis, and determine a final elevation angle by obtaining an average of the calculated elevation angles.

According to the present disclosure, an elevation angle of a target is estimated in a diagonal direction in which each non-offset reception channel of N reception channels at which a reception array antenna operates is tilted with respect to an azimuth angle of an offset reception channel thereof. Thus, the elevation angle, as well as the azimuth angle, can be calculated, without a separate channel and a receiver for calculating the elevation angle, and the azimuth angle and the elevation angle can be estimated accordingly without increasing the size of a vehicle radar apparatus.

In addition, according to the present disclosure, by estimating the elevation angle on the basis of an equation, the design degree of freedom of antenna array structure can be increased and a computation time can be decreased.

Effects of the present disclosure are not limited to those described above, and various effects that, from the following description, are obvious to a person of ordinary skill in the art fall within the scope of the present disclosure.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
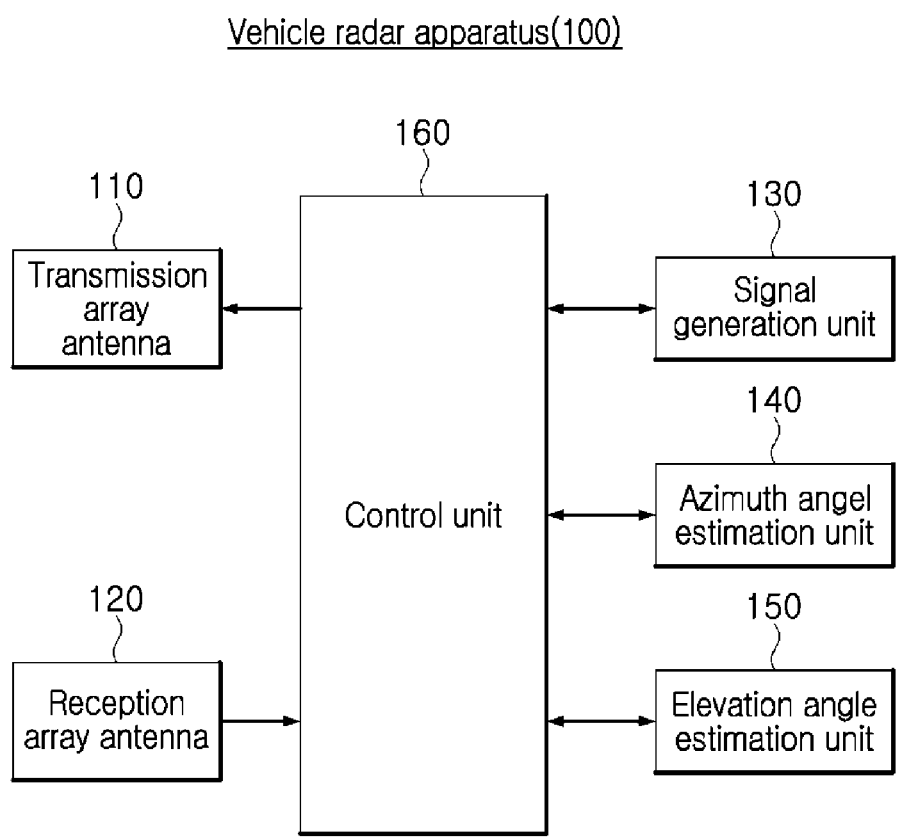
FIG. 1 is a flowchart for schematically describing a vehicle radar apparatus according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions.

Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, a vehicle radar apparatus and a method of controlling the vehicle radar apparatus will be described below with reference to the accompanying drawings through various examples of embodiments.

For clarity and convenience in this description, thicknesses of lines, sizes of constituent elements, and the like are illustrated in an exaggerated manner in the drawings.

In addition, terms that will be used below are defined by considering functions for which the terms are used according to the present disclosure, and may vary according to the intention of a user or a manager or according to the common practices in the art. Therefore, definitions of these terms should be stated in light of details disclosed throughout the present specification.

In addition, a realization described in the present specification, for example, may take place in the form of a method, a process, an apparatus, a software program, a data stream, or a signal. Although a realization of a feature is described only in the context of a single form (for example, described only in the context of the form of a method), the realization of the feature, which is described, may also take place in a different form (for example, an apparatus or a program). The apparatus may be realized in suitable hardware, software, firmware, or the like. The method, for example, may be realized in an apparatus, such as a computer, a microprocessor, or a processor that generally refers to a processing device, such as an integrated circuit or a programmable logic device. The apparatuses also include a computer a cellular phone, and communication devices such as a mobile information terminal, a personal digital assistant (PDA), and other devices, that facilitate communication of information between end users.

Figure 2:
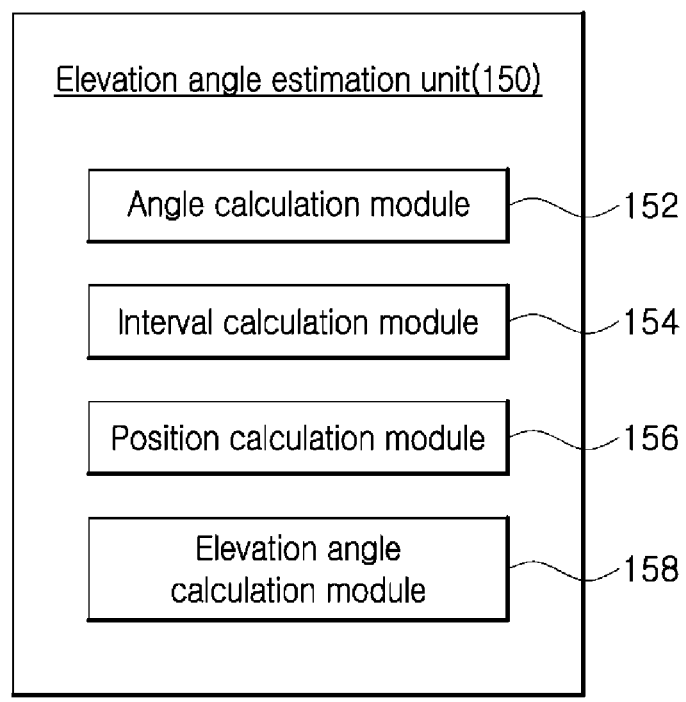
FIG. 2 is a block diagram for describing an elevation angle estimation unit that is illustrated in FIG. 1.
Figure 3:
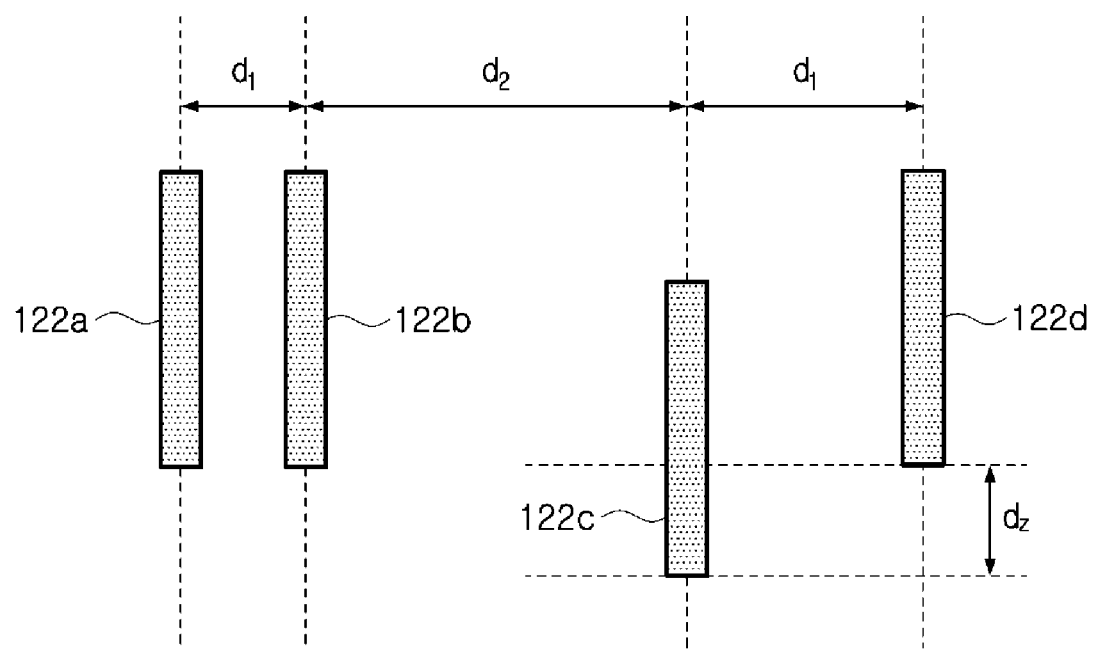
FIG. 3 is a diagram for describing a reception channel at which a reception array antenna according to an embodiment of the present disclosure operates.
Figure 4:
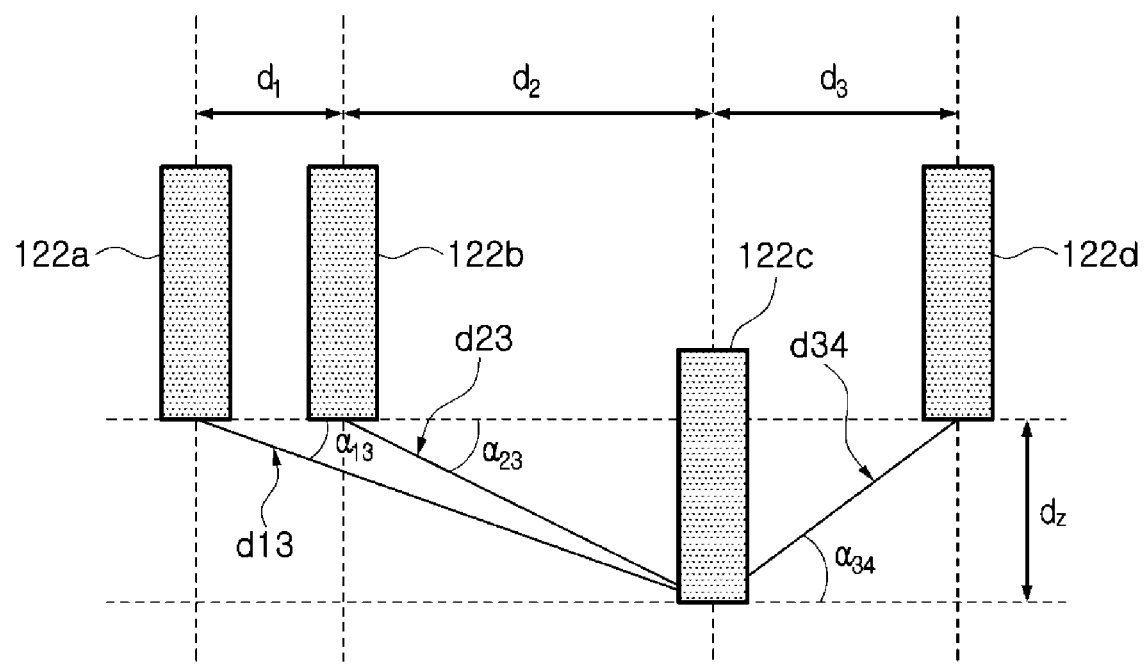
FIG. 4 is an illustrative diagram for describing a method of calculating a tilted angle and an interval between reception channels according to an embodiment of the present disclosure.
Figure 5:
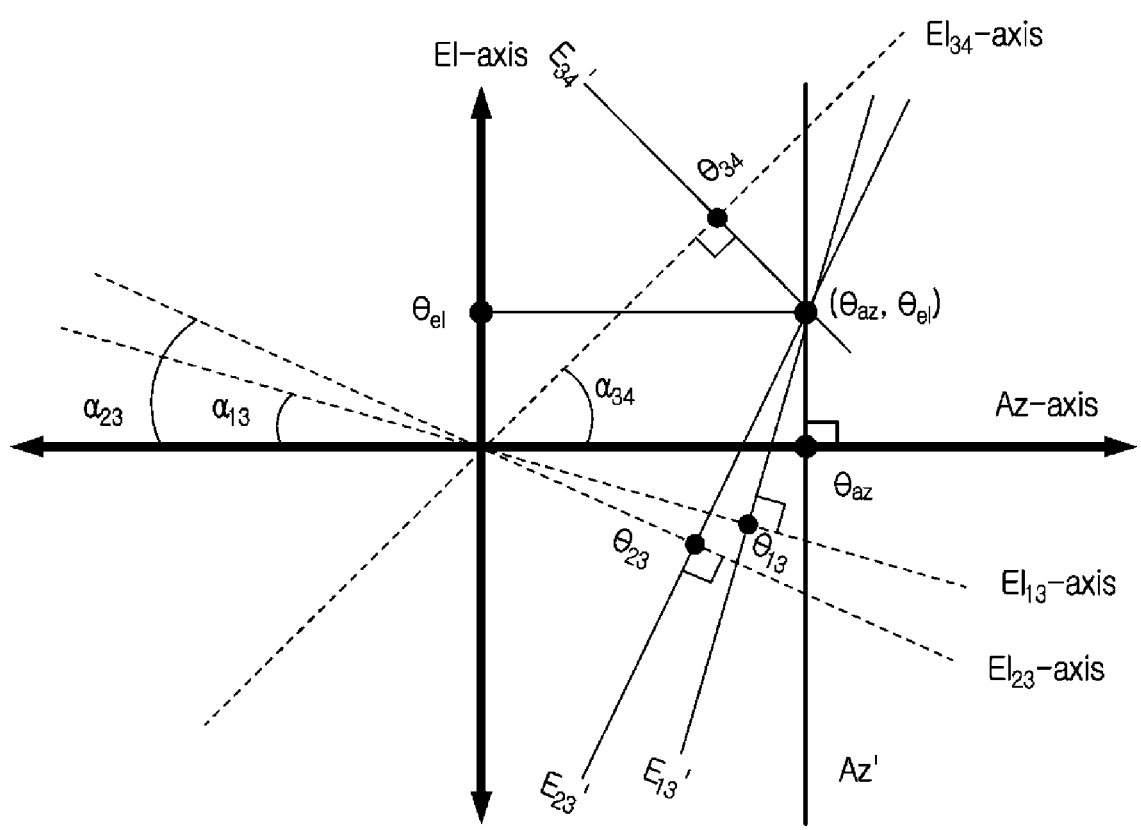
FIG. 5 is a diagram for describing a coordinate system for the reception channel according to an embodiment of the present disclosure.
Figure 6:
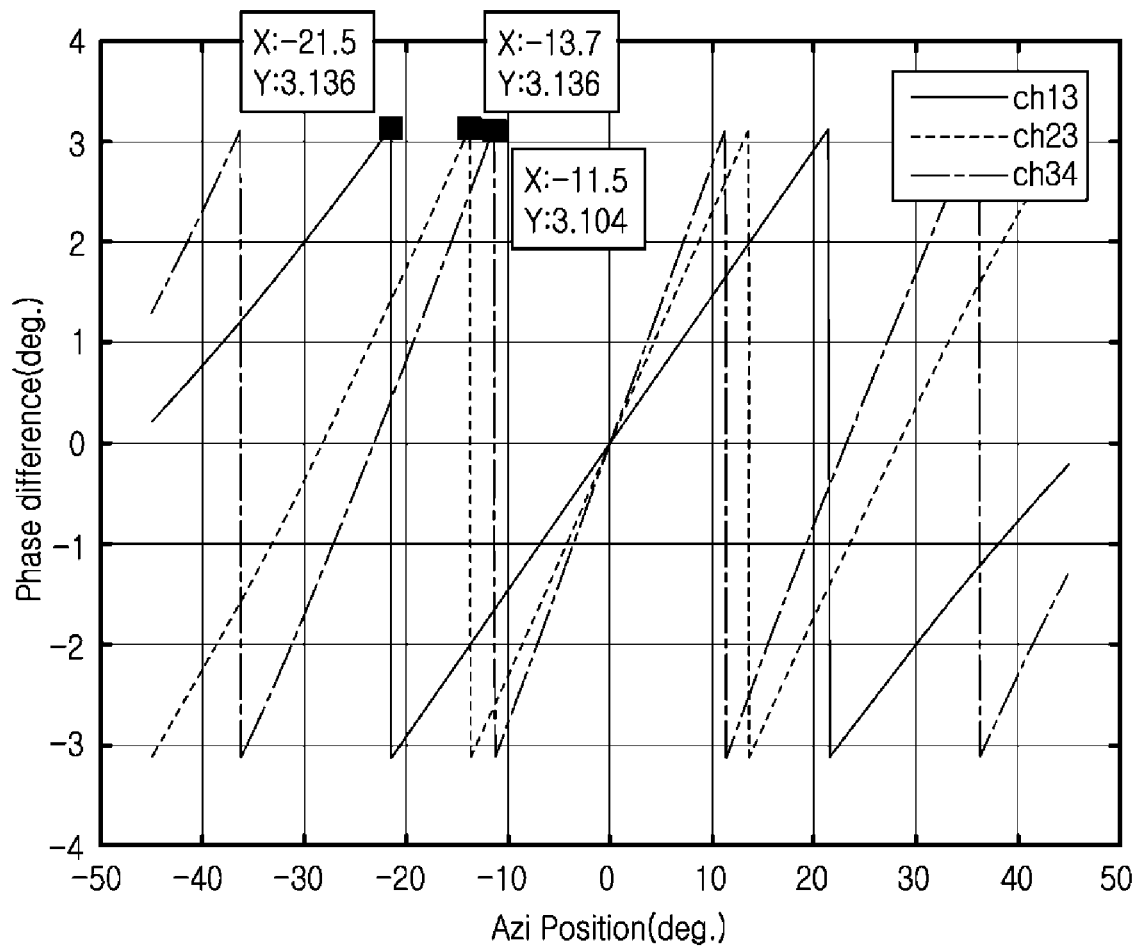
FIG. 6 is a graph for describing a phase difference between an offset reception channel and a non-offset adjacent reception channel according to an embodiment of the present is disclosure.
Figure 7:
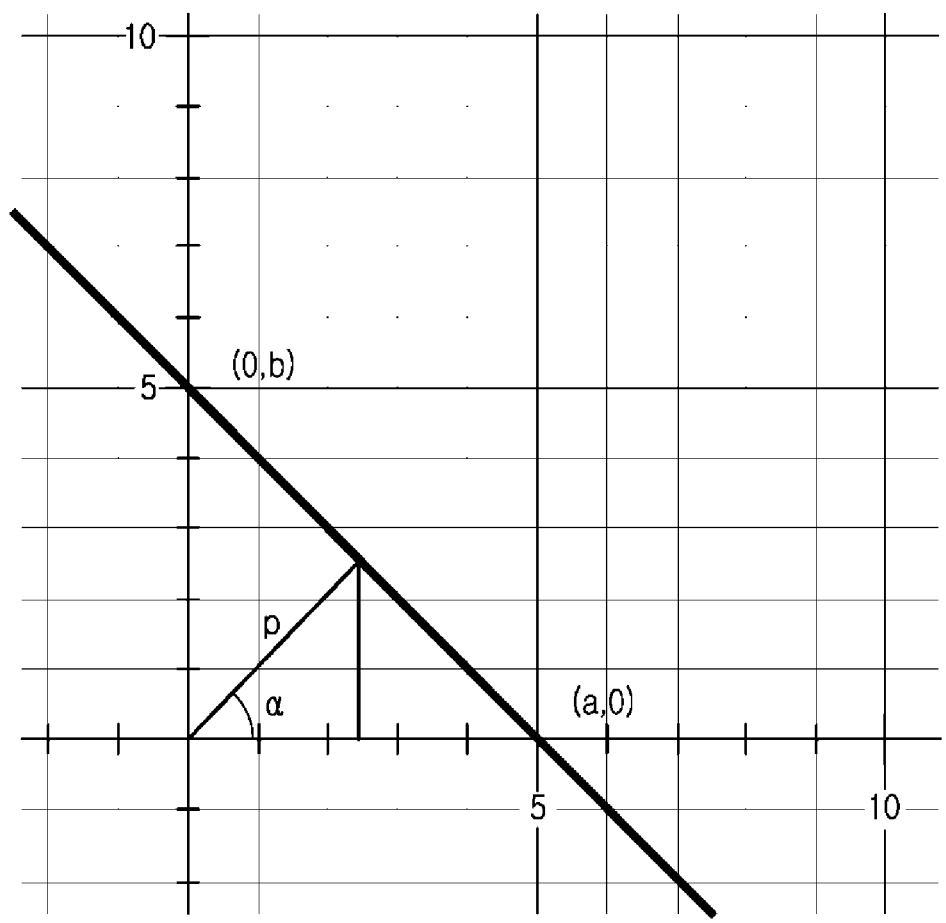
FIG. 7 is a diagram for describing a linear equation for calculating an elevation angle from a positional value according to an embodiment of the present disclosure.

FIG. 1 is a diagram for schematically describing a vehicle radar apparatus according to the embodiment of the present disclosure. FIG. 2 is a block diagram for describing an elevation angle estimation unit that is illustrated in FIG. 1. FIG. 3 is a diagram for describing a reception channel at which a reception array antenna according to an embodiment of the present disclosure operates. FIG. 4 is an illustrative diagram for describing a method of calculating a tilted angle and an interval between the reception channels according to an embodiment of the present disclosure. FIG. 5 is a diagram for describing a coordinate system for the reception channel according to an embodiment of the present disclosure. FIG. 6 is a graph for describing a phase difference between an offset reception channel and a non-offset adjacent reception channel according to an embodiment of the present disclosure. FIG. 7 is a diagram for describing a linear equation for calculating an elevation angle from a positional value according to an embodiment of the present disclosure.

Referring to FIG. 1, a vehicle radar apparatus 100 according to an embodiment of the present disclosure may include a transmission array antenna 110, a reception array antenna 120, a signal generation unit 130, an azimuth angle estimation unit 140, an elevation angle estimation unit 150, and a control unit 160.

The transmission array antenna 110 may be configured to radiate a radar signal for forward detection. The transmission array antenna 110 is configured with multiple channels and each of the many channels is configured with multiple radiation elements.

The reception array antenna 120 may operate at a reception channel for receiving the radar signal which is radiated by the transmission array antenna 110, reflects from a target, and returns. The reception array antenna 120, like the transmission array antenna 110, may also be configured to operate at various reception channels.

Under the control of the control unit 160, the signal generation unit 130 may generate a frequency signal that is to be provided to the transmission array antenna 110. For example, the signal generation unit 130 may generate a super high frequency in the form of a frequency modulation continuous wave (FWCW). In addition, the signal generation unit 130 may provide the reception array antenna 120 with a reference signal corresponding to the frequency signal.

The azimuth angle estimation unit 140 may estimate an azimuth angle of the target using a non-offset reception channel of N (N is an integer greater than zero) reception channels at which the reception array antenna 120 operates. Here, an offset is a separation interval that is given in a vertical direction in order to estimate an elevation angle component, and the controller 160 may set a range of offsets to be suitable for a range where an elevation angle is intended to be identified. Therefore, being offset may mean that the separation interval is given in the vertical direction, and being non-offset may mean that the separation interval is not given in the vertical direction.

Not only a requirement for an azimuth angle, but also a function of identifying the target having an elevation angle is required of the vehicle radar apparatus 100, and both an azimuth angle and an elevation angle need to be estimated in accordance with a restricted size and the number of reception channels. The reception array antenna 120 may be used in the vehicle radar apparatus 100 in order to detect a target in an azimuth angle direction. In order to estimate an elevation angle, one or more reception channels of the N reception channels at which the reception array antenna 120 operates may be arranged by being offset at a fixed interval in the vertical direction. The vehicle radar apparatus 100 may estimate an azimuth angle using a reception channel that is non-offset in the reception array antenna 120. Based on a relationship with an antenna that is offset using the estimated azimuth angle, the vehicle radar apparatus 100 may estimate an elevation angle.

Regarding a reception channel at which the reception array antenna 120 operates, referring to FIG. 3, the reception array antenna 120 may operate at a first reception channel 122a, a second reception channel 122b, a third reception channel 122c, and a fourth reception channel 122d. The first reception channel 122a, the second reception channel 122b, and the fourth reception channel 122d may be reception channels that are non-offset, and the third reception channel 122c may be a reception channel that is offset. Here, for convenience in description, the number of the reception channels at which the reception array antenna 120 operates is limited to 4, and the number of the offset reception channels is limited to 1. However, the number of the reception channels may be N, and the number of the offset reception channels may be 2 or greater.

The azimuth angle estimation unit 140 may estimate the azimuth angle of the target using (N−1) non-offset reception channels, other than an offset reception channel, of the N reception channels. A case where, for example, the reception array antenna 120, as illustrated in FIG. 3, is configured to operate at four reception channels is described. In this case, the azimuth angle estimation unit 140 may estimate an azimuth angle using two reception channels, for example, the first reception channel 122a and the second reception channel 122b, of three non-offset reception channels, the first reception channel 122a, the second reception channel 122b, and the fourth reception channel 122d, other than the offset third reception channel 122c. At this time, the first reception channel 122a and the second reception channel 122b may be two channels that are at an interval from each other only in the vertical or horizontal direction.

A phase difference between radar signals that are received on the first reception channel 122a and the second reception channel 122b may be calculated from Equation 1.

$$\Delta\emptyset = \emptyset_2 - \emptyset_1 = \frac{2\pi}{\lambda} d\sin\theta \qquad \text{Equation 1}$$

where $\emptyset_1$ denotes a phase of a radar signal that reflects from a target and is received on the first reception channel 122a, $\emptyset_2$ denotes a phase of a radar signal that reflects from the target and is received on the second reception channel 122b, $\Delta\emptyset$ denotes a phase difference, $\lambda$ denotes a wavelength of the received radar signal, d denotes an interval between the first reception channel 122a and the second reception channel 122b, and $\theta$ denotes an azimuth angle.

Equation 1 may be rearranged into the following Equation 2 to obtain an expression for $\sin\theta$.

$$\sin\theta = \frac{\lambda}{2\pi} \frac{\Delta\emptyset}{d} \qquad \text{Equation 2}$$

Equation 2 may be rearranged into the following Equation 3 to obtain an expression for $\theta$. $\theta$ that is an azimuth angle of the target may be estimated from Equation 3.

$$\theta = \sin^{-1}\left(\frac{\lambda}{2\pi} \frac{\Delta\emptyset}{d}\right) \qquad \text{Equation 3}$$

The elevation angle estimation unit 150 may estimate the elevation angle of the target in a diagonal direction in which each non-offset reception channel of the N reception channels is tilted with respect to an azimuth angle of the offset reception channel thereof. That is, the elevation angle estimation unit 150 may estimate the elevation angle of the target using an angle at which each non-offset reception channel at which the reception array antenna 120 operates is tilted with respect to the azimuth angle of the offset reception channel, an interval between the reception channels, and a phase difference between the offset reception channel and the non-offset reception channel.

A case where, for example, the reception array antenna 120, as illustrated in FIG. 4, is configured to operate at four reception channels is described. In the reception array antenna 120 configured as illustrated in FIG. 4, the elevation angle estimation unit 150 may calculate an elevation angle component in a diagonal direction between the offset third reception channel 122c and the non-offset first reception channel 122a, calculates an elevation component in a diagonal direction between the third reception channel 122c and the second reception channel 122b, and calculates an elevation component in a diagonal direction between the third reception channel 122c and the fourth reception channel 122d.

The elevation angle estimation unit 150, as illustrated in FIG. 2, may include an angle calculation module 152, an interval calculation module 154, a position calculation module 156, and an elevation angle calculation module 158.

The angle calculation module 152 may calculate the angle at which each non-offset reception channel is tilted with respect to the azimuth angle of the offset reception channel. That is, using the following Equation 4, the angle calculation module 152 may calculate an angle ($\alpha 13$) at which the first reception channel 122a is tilted with respect to an azimuth angle of the third reception channel 122c, an angle ($\alpha 23$) at which the second reception channel 122b is tilted with respect to the azimuth angle of the third reception channel 122c, and an angle ($\alpha 34$) at which the fourth reception channel 122d is tilted with respect to the azimuth angle of the third reception channel 122c.

$$\alpha_{13} = \tan^{-1}\left(\frac{d_z}{(d_1 + d_2)}\right) \qquad \text{Equation 4}$$

$$\alpha_{23} = \tan^{-1}\left(\frac{d_z}{d_2}\right)$$

$$\alpha_{34} = \tan^{-1}\left(\frac{d_z}{d_3}\right)$$

where $d_z$ is a separation interval that is given in the vertical direction between the non-offset reception channel and the offset reception channel, $d_1$ is an interval between the first reception channel 122a and the second reception channel 122b, $d_2$ is an interval between the second reception channel 122b and the third reception channel 122c, and $d_3$ is an interval between the fourth reception channel 122d and the third reception channel 122c.

The interval calculation module 154 may calculate an interval in a diagonal direction in which each non-offset reception channel is tilted with respect to the azimuth angle of the offset reception channel. That is, using the following Equation 5, the interval calculation module 154 may calculate an interval $d_{13}$ in a diagonal direction in which the first reception channel 122a is tilted with respect to the azimuth angle of the third reception channel 122c, an interval $d_{23}$ in a diagonal direction in which the second reception channel 122b is tilted with respect to the azimuth angle of the third reception channel 122c, and an interval $d_{34}$ in a diagonal direction in which the fourth reception channel 122d is tilted with respect to the azimuth angle of the third reception channel 122c.

$$d_{13} = \sqrt{(d_z^2 + (d_3 + d_2)^2)} \qquad \text{Equation 5}$$

$$d_{23} = \sqrt{(d_z^2 + d_2^2)}$$

$$d_{34} = \sqrt{(d_z^2 + d_3^2)}$$

On the other hand, when the non-offset reception channel is tilted with respect to the azimuth angle of the offset reception channel, an axis (a straight line) that has a slope in a diagonal direction may be formed. For example, referring to FIG. 5, when the first reception channel 122a is tilted with respect to the azimuth angle of the third reception channel 122c, an axis ($EI_{13}$-axis) that has a slope in a diagonal direction may be formed. Furthermore, when the second reception channel 122b is tilted with respect to the azimuth angle of the third reception channel 122c, an axis ($EI_{23}$-axis) that has a slope in a diagonal direction may be formed. Furthermore, when the fourth reception channel 122d is tilted with respect to the azimuth angle of the third reception channel 122c, an axis ($EI_{34}$-axis) that has a slope in a diagonal direction may be formed.

From this axis (a straight line), a positional value having a phase difference between the offset reception channel and the non-offset reception channel may be calculated. Accordingly, the position calculation module 156 may calculate a positional value on the corresponding axis, using the phase difference between the offset reception channel and each non-offset reception channel. At this time, the position calculation module 156 may calculate the phase difference ($\Delta\varnothing'$) between the offset reception channel and each non-offset reception channel, using the following Equation 6.

$$\Delta\varnothing' = \varnothing'_2 - \varnothing'_1 = \frac{2\pi}{\lambda} d' \cos(\theta + \theta') \qquad \text{Equation 6}$$

where $\varnothing'_1$ denotes a phase of a radar signal that reflects from a target and is received on the offset reception channel, $\varnothing'_2$ denotes a phase of a radar signal that reflects from the target and is received on the non-offset reception channel, $\Delta\varnothing'$ denotes a phase difference, $\lambda\lambda$ denotes a wavelength of the received radar signal, d' is an interval in a diagonal direction in which each non-offset reception channel is tilted with respect to an azimuth angle of the offset reception channel, the interval being calculated by the interval calculation module 154, $\theta$ denotes an azimuth angle estimated by the azimuth angle estimation unit 140, and $\theta'$ denotes an angle at which each non-offset reception channel is tilted with respect to the azimuth angle of the offset reception channel, the angle being calculated by the angle calculation module 152.

The phase difference between the offset reception channel and each non-offset reception channel, which is calculated through Equation 6, may be the same as illustrated in FIG. 6.

When the phase difference between the offset reception channel and each non-offset reception channel is calculated, the position calculation module 156 may calculate the positional value using the following Equation 7 in which the phase difference and the interval between the offset reception channel and each non-offset reception channel are used.

$$\theta_{13} = \sin^{-1}(\Delta\phi_{13}/(k \times d_{13}))$$

$$\theta_{23} = \sin^{-1}(\Delta\phi_{23}/(k \times d_{23}))$$

$$\theta_{34} = \sin^{-1}(\Delta\phi_{34}/(k \times d_{34})) \qquad \text{Equation 7}$$

where $\Delta\phi_{13}$ denotes a phase difference between the first reception channel 122a and the third reception channel 122c, $\Delta\phi_{23}$ denotes a phase difference between the second reception channel 122b and the third reception channel 122c, and $\Delta\phi_{34}$ denotes a phase difference between the third reception channel 122c and the fourth reception channel 122d.

On the other hand, the positional value calculated by the position calculation module 156 is a positional value that is present on an axis in a diagonal direction in which each non-offset reception channel is tilted with respect to the azimuth angle of the offset reception channel. Furthermore, the positional value is a value that contains the azimuth angle and the elevation value and is only a value on the horizontal line with respect to each axis. However, a vertical component with respect to each axis is necessary in order to calculate an elevation angle. Accordingly, a straight line is drawn, in the direction vertical to the axis, from the positional value on each axis in the diagonal direction in which each non-offset reception channel is tilted with respect to the azimuth angle of the offset reception channel. As a result, as illustrated in FIG. 5, straight line $E_{13}'$ vertical to $El_{13}$-axis may be drawn, straight line $E_{23}'$ vertical to $El_{23}$-axis may be drawn, and straight line $E_{34}'$ vertical to $El_{34}$-axis may be drawn. The elevation angle may be calculated using the straight line as drawn above.

The elevation angle calculation module 158 may calculate an elevation angle that corresponds to the positional value, using the straight line that is drawn, in the direction vertical to the corresponding axis, from the positional value on each axis in the diagonal direction in which each non-offset reception channel is tilted with respect to the azimuth angle of the offset reception channel, and determines a final elevation angle using the each calculated elevation angle. That is, the elevation angle calculation module 158 may calculate an elevation angle at each position represented by a coordinate system by substituting a tilted angle, an interval, and a positional value into a linear equation for which a graph is the straight line that is drawn, in the direction vertical to the corresponding axis, from the positional value on each axis, and determines a final elevation angle by obtaining an average of the calculated elevation angles. At this time, the elevation angle calculation module 158 may calculate the average of the elevation angles by assigning a weighting factor that increases as the non-offset reception channel gets closer to the offset reception channel.

The elevation angle calculation module 158 may calculate each elevation angle using the linear equation into which the positional value calculated by the position calculation module 156 is substituted. At this time, the elevation angle calculation module 158 may calculate the elevation angle using the following Equation 8.

$$y = \{p - x \cos(\alpha)\}/\sin(\alpha) \qquad \text{Equation 8}$$

where x denotes an azimuth angle ($\theta_{az}$), $\alpha$ denotes a tilted angle, p denotes each of $\theta_{13}$, $\theta_{23}$, and $\theta_{34}$, and y denotes an elevation angle ($\theta_{el}$).

Therefore, an elevation angle between the first reception channel 122a and the third reception channel 122c may be calculated by substituting $\alpha_{13}$ and $\theta_{13}$ into $\alpha$ and p, respectively, an elevation angle between the second reception channel 122b and the third reception channel 122c may be calculated by substituting $\alpha_{23}$ and $\theta_{23}$ into $\alpha$ and p, respectively, and an elevation angle between the third reception channel 122c and the fourth reception channel 122d may be calculated by substituting $\alpha_{34}$ and $\theta_{34}$ into $\alpha$ and p, respectively.

On the other hand, the linear equation into which the positional value is substituted is described with reference to FIG. 7. A linear equation for which a graph is a straight line that is illustrated in FIG. 7 may be (yy1)/(xx1)=(y2y1)/

(x2x1). When y1=0, x1=a, y2=b, and x2=0 are substituted into the linear equation, this may be rearranged into the following Equation 9.

$$y/(x-a)=b/(-a)$$

$$-ay=bx-ab$$

$$bx+ay=ab$$

$$x/a+y/b=1$$

$$a=p \sec \alpha$$

$$b=p \csc \alpha$$

$$x/(p \sec \alpha)+y/(p \csc \alpha)=1$$

$$x \cos \alpha + y \sin \alpha = p \qquad \text{Equation 9}$$

Consequently, the linear equation for which the graph is the straight line that is illustrated in FIG. 7 may be x cos α+y sin α=p. When this linear equation is rearranged into an equation as an expression for y, this may be expressed as in Equation 8.

When an elevation angle between the third reception channel 122c and another reception channel is calculated using Equation 8, the elevation angle calculation module 158 may determine an elevation angle by obtaining an average of elevation angles between reception channels. At this time, the elevation angle calculation module 158 may calculate the average by assigning a greater weighting factor to the reception channel having the greatest tilted angle.

On the other hand, each of the signal generation unit 130, the azimuth angle estimation unit 140, and the elevation angle estimation unit 150 may be realized by a processor or the like necessary for executing a program on a computing apparatus. In this manner, each of the signal generation unit 130, the azimuth angle estimation unit 140, and the elevation angle estimation unit 150 may be realized as a physically independent constituent and may be realized within one processor so as to be functionally separated.

On the other hand, although not illustrated, the vehicle radar apparatus 100 may further include an ADC (not illustrated) that converts the radar signal received from the reception array antenna 120 into a digital signal and outputs the resulting digital signal to the azimuth angle estimation unit 140.

The control unit 160 is configured to control operations of various constituents including the transmission array antenna 110, the reception array antenna 120, the signal generation unit 130, the azimuth angle estimation unit 140, and the elevation angle estimation unit 150, of the vehicle radar apparatus 100. The control unit 160 may include at least one processing device. The processing devices here include a general-purpose central processing unit (CPU), programmable devices (a CPLD and an FPGA) that are suitably realized for specific purposes, an on-demand semiconductor computing device (an ASIC) and a microcontroller chip.

Figure 8:
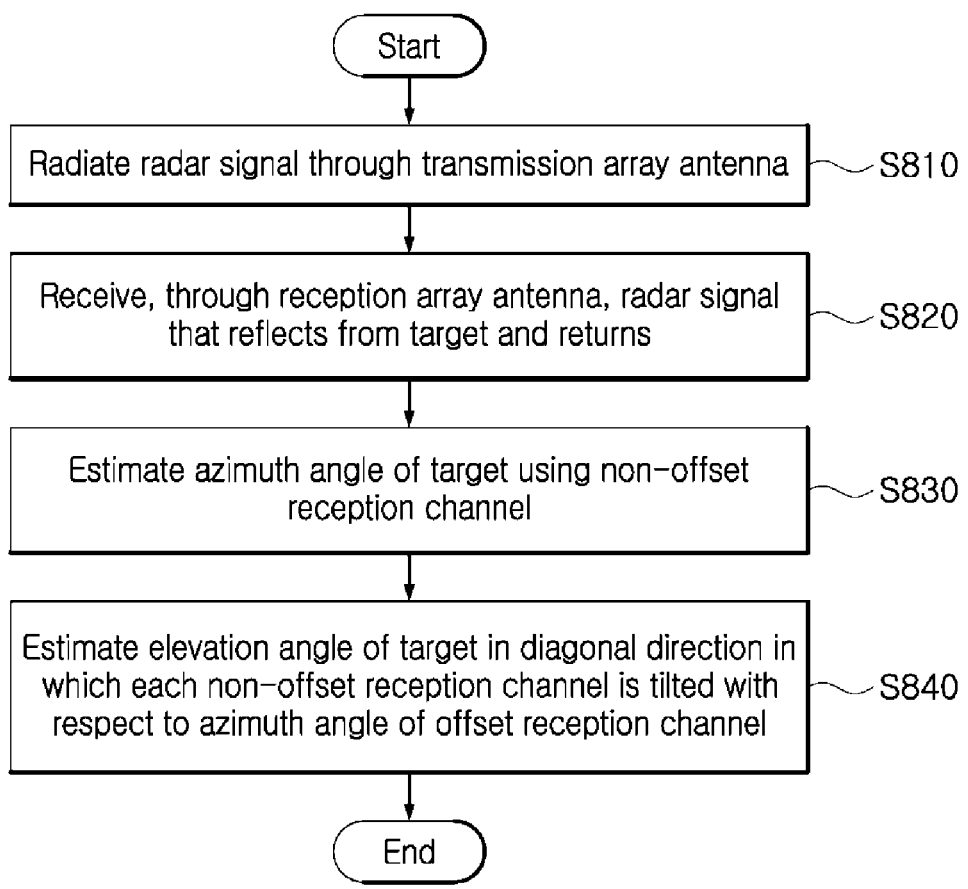
FIG. 8 is a flowchart for describing a method of controlling a vehicle radar apparatus according to an embodiment of the present disclosure.

FIG. 8 is a flowchart for describing a method of controlling a vehicle radar apparatus according to an embodiment of the present disclosure.

Referring to FIG. 8, the vehicle radar apparatus 100 radiates a radar signal for forward detection by the transmission array antenna 110 (S810).

When Step S810 is performed, the vehicle radar apparatus 100 receives, on N reception channels 122 at which the reception array antenna 120 operates, a radar signal that is radiated by the transmission array antenna 110, reflects from a target, and returns (S820).

When Step S820 is performed, the vehicle radar apparatus 100 estimates an azimuth angle of the target using (N−1) non-offset reception channels, other than the offset reception channel, of the N reception channels 122 (S830). The azimuth angle of the target may be estimated using Equations 1 to 3 that are described above.

When Step S830 is performed, the vehicle radar apparatus 100 estimates an elevation angle of the target in a diagonal direction in which each non-offset reception channel is tilted with respect to the azimuth angle of the offset reception channel (S840). A method in which the vehicle radar apparatus 100 estimates the elevation angle of the target is described in detail with reference to FIG. 9.

Figure 9:
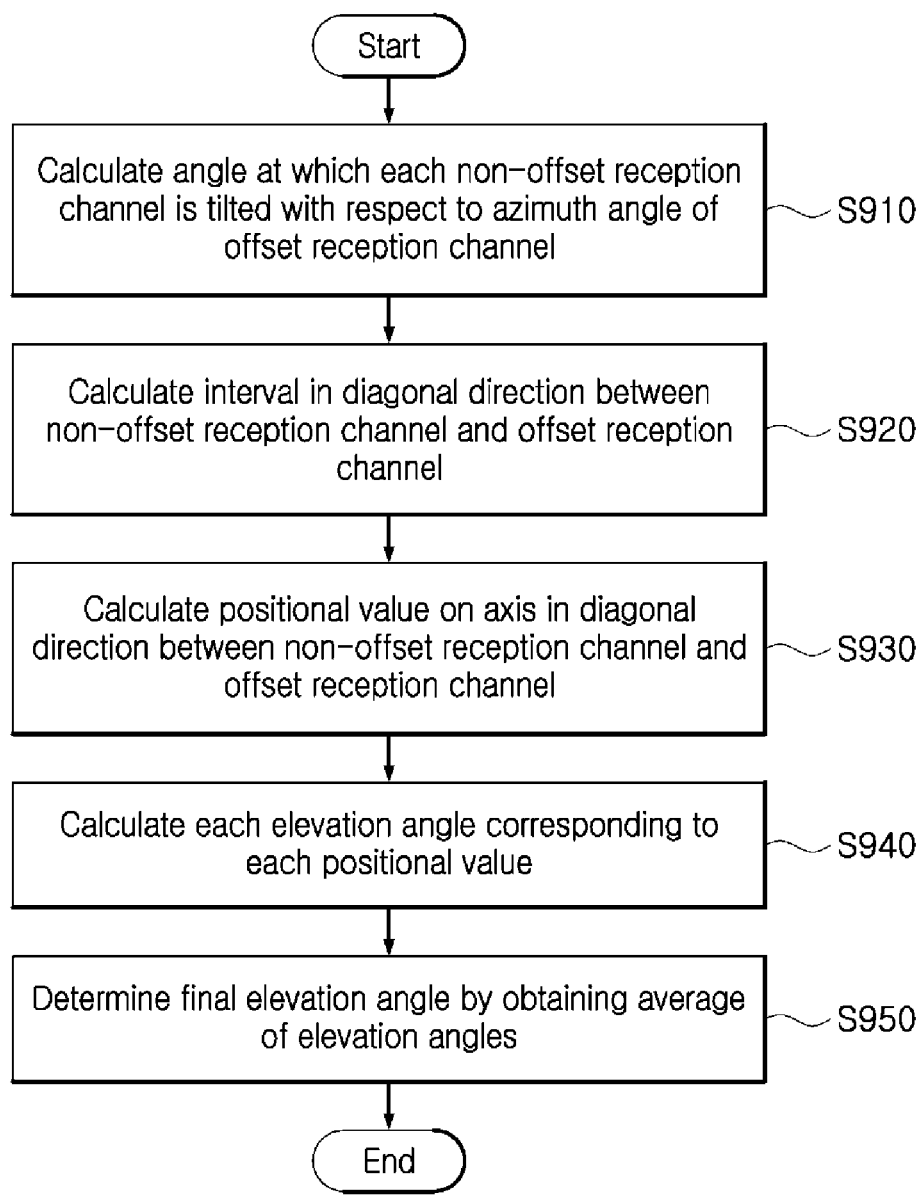
FIG. 9 is a flowchart for describing a method in which the vehicle radar apparatus according to the embodiment of the present disclosure estimates the elevation angle.

FIG. 9 is a flowchart for describing the method in which the vehicle radar apparatus according to the embodiment of the present disclosure estimates the elevation angle.

Referring to FIG. 9, the vehicle radar apparatus 100 calculates an angle at which each non-offset reception channel is tilted with respect to the azimuth angle of the offset reception channel (S910).

When Step S910 is performed, the vehicle radar apparatus 100 estimates an interval between the reception channels in a diagonal direction in which each non-offset reception channel is tilted with respect to the azimuth angle of the offset reception channel (S920).

When Step S920 is performed, the vehicle radar apparatus 100 calculates a positional value on each axis in a diagonal direction in which each non-offset reception channel is tilted with respect to the azimuth angle of the offset reception channel, using a phase difference between the offset reception channel and each non-offset reception channel (S930).

When Step S930 is performed, the vehicle radar apparatus 100 calculates an elevation angle that corresponds to the positional value, using a straight line that is drawn from the positional value on each axis in the direction vertical to the corresponding axis (S940).

When Step S940 is performed, the vehicle radar apparatus 100 determines a final elevation angle by obtaining an average of the elevation angles that correspond to the respective positional values, (S950).

As described above, a vehicle safety apparatus and a method of controlling the vehicle safety apparatus according to an embodiment of the present disclosure may estimate an elevation angle of a target in a diagonal direction in which each non-offset reception channel of N reception channels at which a reception array antenna operates is tilted with respect to an azimuth angle of an offset reception channel thereof, and thus calculate the elevation angle, as well as the azimuth angle, without a separate channel and a receiver for calculating the elevation angle. Because of this, the azimuth angle and the elevation angle can be estimated without increasing the size of a vehicle radar apparatus.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A vehicle radar apparatus comprising:
a transmission array antenna configured to radiate a radar signal for forward detection;

a reception array antenna configured to operate at N (N is an integer greater than zero) reception channels for receiving the radar signal that is radiated by the transmission array antenna, reflects from a target, and returns to be received by the reception array antenna;

an azimuth angle estimation unit configured to estimate an azimuth angle of the target using each non-offset reception channel of the N reception channels; and an elevation angle estimation unit configured to estimate an elevation angle of the target in a diagonal direction in which the each non-offset reception channel is projected with reference to an offset reception channel thereof by a tilted angle, wherein:

the elevation angle estimation unit comprises:

an angle calculation module configured to calculate an angle at which the each non-offset reception channel is tilted with respect to the azimuth angle of the offset reception channel;

an interval calculation module configured to calculate an interval between the reception channels in the diagonal direction in which the each non-offset reception channel is tilted with respect to the azimuth angle of the offset reception channel;

a position calculation module configured to calculate a positional value on each axis in the diagonal direction in which the each non-offset channel is tilted with respect to the azimuth angle of the offset reception channel, using a phase difference between the offset reception channel and the each non-offset reception channel; and an elevation angle calculation module configured to calculate an elevation angle that corresponds to the positional value, using a straight line drawn from the positional value on the each axis in a direction vertical to the corresponding axis and to determine a final elevation angle using each of the calculated elevation angles; and the elevation angle calculation module:

calculates an elevation angle at each position represented by a coordinate system by substituting the tilted angle, the interval in the diagonal direction between the reception channels, and the positional value on the each axis into a linear equation for which a graph is a straight line drawn from the positional value on the each axis in the direction vertical to the corresponding axis, and determines a final elevation angle by obtaining an average of the calculated elevation angles.

2. The vehicle radar apparatus of claim 1, wherein the angle calculation module calculates the tilted angle using a separation interval in the vertical direction and an interval in a horizontal direction between the each non-offset reception channel and the offset reception channel.

3. The vehicle radar apparatus of claim 1, wherein the position calculation module calculates the positional value on the each axis using the tilted angle calculated by the angle calculation module, the interval between the reception channels in the diagonal direction, which is calculated by the interval calculation module, and the phase difference between the offset reception channel and the each non-offset reception channel.

4. The vehicle radar apparatus of claim 1, wherein the elevation angle calculation module calculates the average of the elevation angles by assigning a weighting factor that increases as the non-offset reception channel gets closer to the offset reception channel.

5. The vehicle radar apparatus of claim 1, further comprising a signal generation unit configured to generate a frequency signal that is to be provided to the transmission array antenna.

6. A method of controlling a vehicle radar apparatus, the method comprising:

radiating, by a transmission array antenna, a radar signal for forward detection;

receiving, by a reception array antenna operating at N (N is an integer greater than zero) reception channels, a radar signal that is radiated by the transmission array antenna, reflects from a target, and returns to the reception array antenna;

estimating an azimuth angle of the target using each non-offset reception channel of the N reception channels; and estimating an elevation angle of the target in a diagonal direction in which the each non-offset reception channel is projected with reference to an offset reception channel thereof by a tilted angle, wherein:

the estimating of the elevation angle comprises:

calculating an angle at which the each non-offset reception channel is tilted with respect to the azimuth angle of the offset reception channel;

calculating an interval between the reception channels in the diagonal direction in which the each non-offset reception channel is tilted with respect to the azimuth angle of the offset reception channel;

calculating a positional value on each axis in the diagonal direction in which the each non-offset channel is tilted with respect to the azimuth angle of the offset reception channel, using a phase difference between the offset reception channel and the each non-offset reception channel; and calculating an elevation angle that corresponds to the positional value, using a straight line drawn from the positional value on the each axis in a direction vertical to the corresponding axis and determining a final elevation angle using each of the calculated elevation angles; and the determining of the final elevation angle comprises:

calculating an elevation angle at each position represented by a coordinate system by substituting the tilted angle, the interval in the diagonal direction between the reception channels, and the positional value on the each axis in the diagonal direction into a linear equation for which a graph is a straight line drawn from the positional value on the each axis in the direction vertical to the corresponding axis; and determining a final elevation angle by obtaining an average of the calculated elevation angles.

7. The method of claim 6, wherein the calculating of the angle comprises calculating the tilted angle using a separation interval in the vertical direction and an interval in a horizontal direction between the each non-offset reception channel and the offset reception channel.

8. The method of claim 6, wherein the calculating of the positional value on each axis in the diagonal direction comprises calculating the positional value on the each axis using the calculated tilted angle, the calculated interval between the reception channels in the diagonal direction, and the phase difference between the offset reception channel and the each non-offset reception channel.

* * * * *